2 Sheets—Sheet 1.

G. W. BAKER.
Lubricator for Steam-Valves of Locomotives.

No. 227,199. Patented May 4, 1880.

2 Sheets—Sheet 2.

G. W. BAKER.
Lubricator for Steam-Valves of Locomotives.

No. 227,199. Patented May 4, 1880.

Witnesses,
Jas. S. Miller
C. F. Dean

Inventor,
George W. Baker.
Per, Jno K Hallock
Att'y.

N. PETERS, PHOTO-LITHOGRAPHER, WASHINGTON, D. C.

UNITED STATES PATENT OFFICE.

GEORGE W. BAKER, OF ERIE, PENNSYLVANIA.

LUBRICATOR FOR STEAM-VALVES OF LOCOMOTIVES.

SPECIFICATION forming part of Letters Patent No. 227,199, dated May 4, 1880.

Application filed June 21, 1879.

*To all whom it may concern:*

Be it known that I, GEORGE W. BAKER, of Erie, in the county of Erie and State of Pennsylvania, have invented a new and useful Lubricator for Steam-Valves of Locomotives; and I do hereby declare the following to be a full, clear, and exact description thereof.

My invention relates to improvements in devices for oiling the steam-valves of locomotive and other engines; and it consists in providing an improved oil-cup which is connected with the boiler and has a pipe leading to the valve of the engine. When used in connection with locomotive-engines the oil-cup is located in the cab, and a pipe leads from thence under the jacket of the boiler to the steam-chest of the engine. In such cases two devices are used, one on each side of the boiler.

I am aware that it is not new to connect the steam-chest and valve with an oil-cup in the cab by a pipe, for this has been done in such a manner that the oil will be drawn into the chest by the vacuum formed there during the movements of the engine.

In my device the oil is driven into the valve-chamber by a pressure of steam from the boiler, and hence the lubrication can be effected whether the engine is moving or not.
The scope of my invention will fully appear in the following specification and claims.

Figure 1:
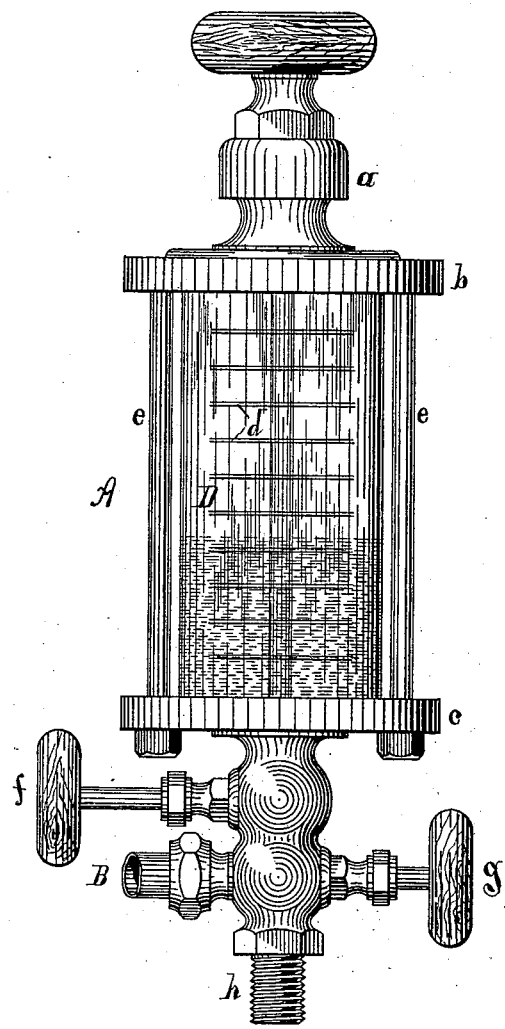
Figure 2:
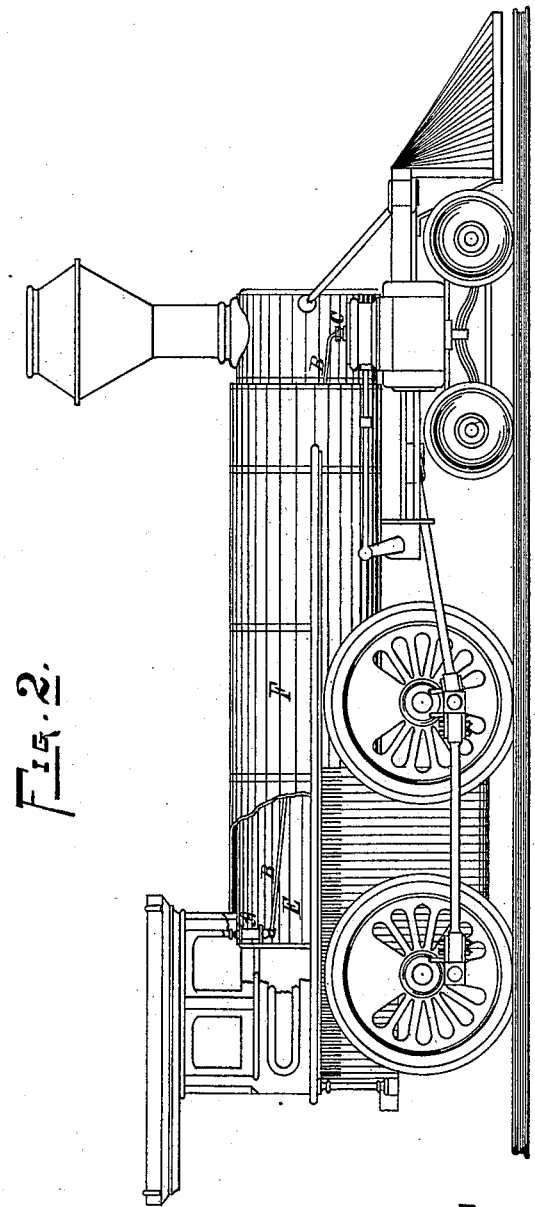

My device is illustrated in the accompanying drawings, as follows:

Figure 1 is an elevation view of the oil-cup and its attachments. Fig. 2 is a side elevation of a locomotive with parts broken away, so as to show the position of the oil-cup and the manner of applying the same.

A is the oil-cup, which is tapped into the boiler. B is the tube leading to the valve-chamber. C is the steam-chest or valve-chamber. E is the boiler, and F is the jacket.

The oil-cup A consists of the following parts, as shown in Fig. 1: D is the oil-reservoir, and is made of glass, and is provided with graduation-marks $d$. It is a cylinder, and has its ends closed by the disks $b$ and $c$, which are clamped to it by the screw-rods or bolts $e$. Thus by the parts D $b$ $c$ and bolts $e$ $e$ $e$ a close and transparent oil-cup is formed. The upper disk, $b$, is provided with an opening for the admission of a supply of oil. This is closed by a screw-cap, $a$. The educt is in the lower disk, $c$, and consists of a pipe, $h$, which at its extremity is screw-threaded for connecting with the boiler. In the pipe $h$ are two throttles or shut-off valves, $f$ and $g$, and from it branches the pipe B, before referred to. The throttle $f$ closes the passage into the oil-reservoir D, and the throttle $g$ closes the passage into the boiler.

The operation of lubricating the valve is as follows: First, open the throttle $f$. This will allow oil to fill the space between the valves $f$ and $g$. Second, close the throttle $f$ and open the throttle $g$. This will cause a current of steam to flow through the pipe B, and carry the oil with it, after which close the throttle $g$. No steam should be permitted to pass into the oil-reservoir D. By a proper attention to the throttle $f$ this will not occur.

By means of the graduations $d$ the engineer can see how much oil he is using.

If it is not desired to tap into the boiler and use the direct pressure of steam, but take the oil into the valve-chamber by suction, so much of my device as is used for connecting with the boiler may be omitted.

I am aware that oilers have heretofore been made with a transparent opening into the reservoir and graduations provided for noting the amount of oil being used. (See Patent No. 121,055, November 21, 1871, to Chas. Lynch.)

I am also aware of the patent to W. Morris, April 29, 1873, No. 138,341, in which the oil is first admitted to a space in the plug of the cock which is located in the steam-passage, and as the plug is further revolved the steam drives the oil into the valve chamber or cylinder of the engine.

My invention, therefore, does not consist in drawing the oil into a passage and then driving it to the valve chamber or cylinder by steam, and thus preventing the steam entering the oil-reservoir, but in the construction substantially as shown.

The advantages of my cup over that of Morris, above referred to, are, that by using a transparent cup or reservoir and two throttles with an intermediate chamber the engineer can draw off as much or as little oil as he chooses, and he can see exactly how much he is using, while with Morris's device the cavity in the plug of the cock must be filled and used at each operation. Therefore,

What I claim as new is—

1. A steam-engine-valve lubricating device consisting of a transparent oil-reservoir, an educt leading from said reservoir to a steam-passage which leads from the boiler to the outer chamber or cylinder of the engine, and two throttles or cocks, one of which is located in the said educt from the oil-reservoir and the other in the said steam-passage at a point between the boiler and the mouth of said educt, each of which throttles operates independent of the other, all being substantially as and for the purposes set forth.

2. The valve-oiling device A, composed of the glass cylinder D, flanges $b$ $c$, induct $a$, educt $h$, throttles $f$ and $g$, and pipe B, leading to the valve-chamber, constructed, arranged, and operating substantially as and for the purposes set forth.

In testimony whereof I, the said GEORGE W. BAKER, have hereunto set my hand.

GEORGE W. BAKER.

Witnesses:
 JNO. K. HALLOCK,
 SELDEN MARVIN.